March 26, 1968 J. M. DEN HERTOG 3,375,327

PULSE CODE RECEIVER

Filed Oct. 1, 1964 2 Sheets-Sheet 1

INVENTOR.
JACOBUS M. DEN HERTOG
BY
Frank R. Trifari
AGENT

March 26, 1968 J. M. DEN HERTOG 3,375,327

PULSE CODE RECEIVER

Filed Oct. 1, 1964 2 Sheets-Sheet 2

INVENTOR.
JACOBUS M. DEN HERTOG
BY Frank R. Trifari
AGENT

3,375,327
PULSE CODE RECEIVER

Jacobus Marius den Hertog, Emmasingel, Eindhoven, Netherlands, assignor to North American Philips Company, Inc., New York, N.Y., a corporation of Delaware Filed Oct. 1, 1964, Ser. No. 400,747
Claims priority, application Netherlands, Oct. 2, 1963, 298,734
9 Claims. (Cl. 178—69.5)

ABSTRACT OF THE DISCLOSURE

A receiver for pulse code signals where successive code groups have the same number of elements, in which means are provided to produce a train of pulses having repetition rates corresponding to a given portion of the duration of one code group, and means for scanning the elements of a following code group with the train of pulses. The system is adapted for the scanning of signals in which the duration of code groups has some variation, in order to facilitate the scanning of the elements of the code groups at their centers.

Figure 1:
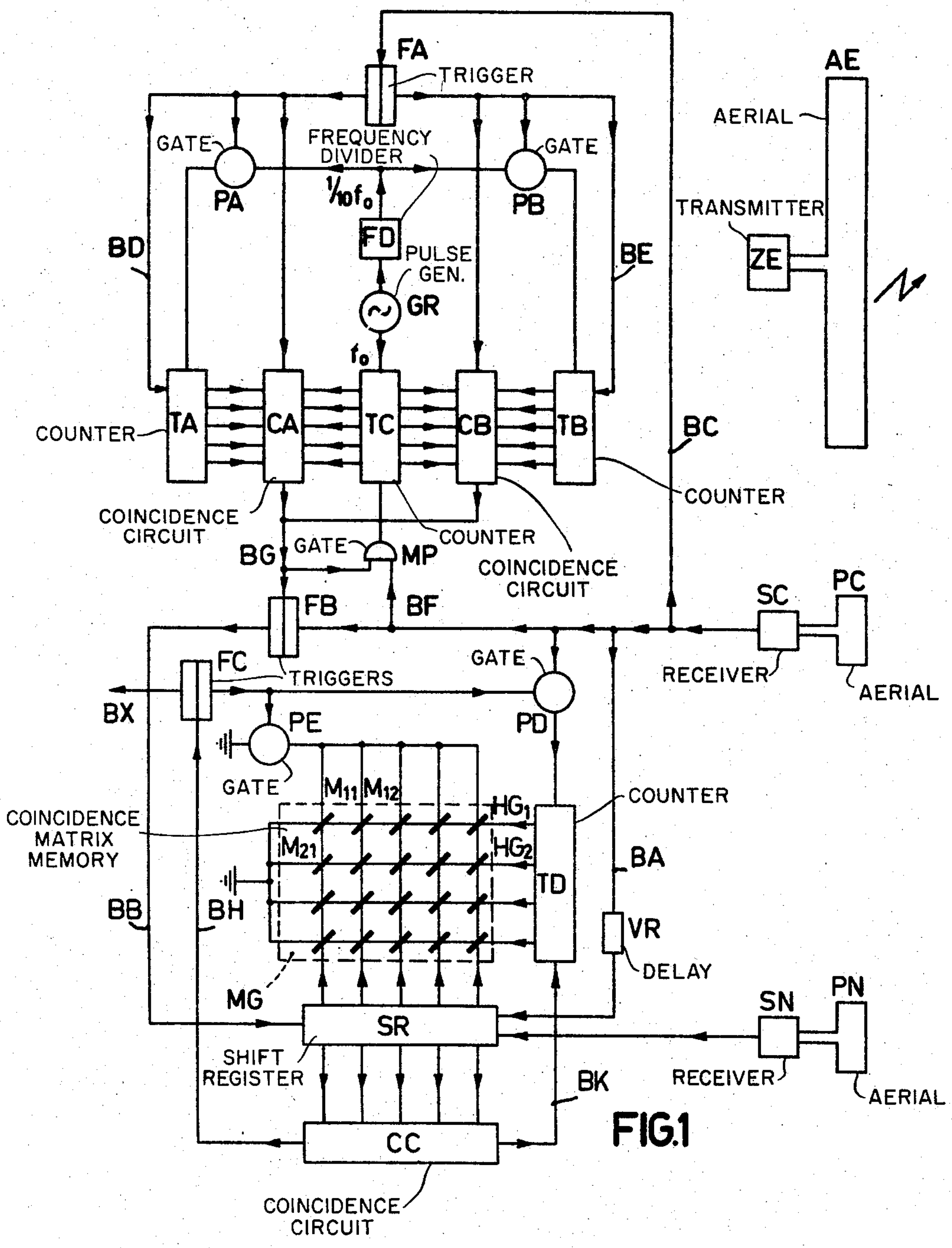

The invention relates to a device for receiving a series of successive pulse code groups, for example telegraph signals, each consisting of a succession of a predetermined number of elements, which may be both rest elements and work elements, together with a series of synchronizing pulses which mark the beginning of the various code groups.

Known receivers for telegraph signals generally comprise a receiver distributor which succesively indicates the various elements of the telegraph signals.

Since in general the pulses may be distorted, it is usual to determine the value of the various elements at instants which correspond to the centres of the elements. So in this case pulses must be available which indicate the centres of the elements.

In other systems the value of the various elements is determined by integrating the incoming signals during the duration of an element and in this case marking pulses must be available which occur at instants which correspond to the separation between the two elements.

In the known systems the production of the required marking pulses in principle is not difficult because the telegraph speed, that is the duration of the various code groups and elements, has a fixed prescribed value, at least deviates only little therefrom in practice. In this case, for example a clock pulse generator is used which is synchronized by the synchronizing pulses and/or the transitions between two elements.

In practice the need exists for a receiving device with which the value of the various elements can be determined in a reliable manner also when the telegraph speed varies strongly, for example by a factor 2 or more. It may occur, for example, that the telegraph speed varies during the information because the signal supplier is synchronized. Alternatively it is possible that various pieces of information originate from transmitters with strongly differing telegraph speeds, for example, a transmitter with a telegraph speed of 50 Baud and another with a telegraph speed of 500 Baud, while nevertheless the same receiver is to be used.

The invention provides a device for receiving a series of successive code groups, with which the telegraph speed can be varied strongly.

The invention is based on the recognition of the fact that although in an absolute sense the telegraph speed may vary strongly, the difference between successive groups is comparatively small, for example smaller than 10%.

The device according to the invention is characterized in that means are available for forming during each period between two synchronizing pulses a quantity which is characteristic of the duration of this period and which is maintained druing a following period and that by means of this quantity the time is divided in a number of subperiods proportional to the number of elements per pulse code group for forming scanning marking pulses.

In order that the invention may readily be carried into effect, it will now be described more fully, by way of example, with reference to a embodiment of an identification device for railway carriages shown in the drawing.

Figures 2, 3, 4A, 4B, 4C, 4D:
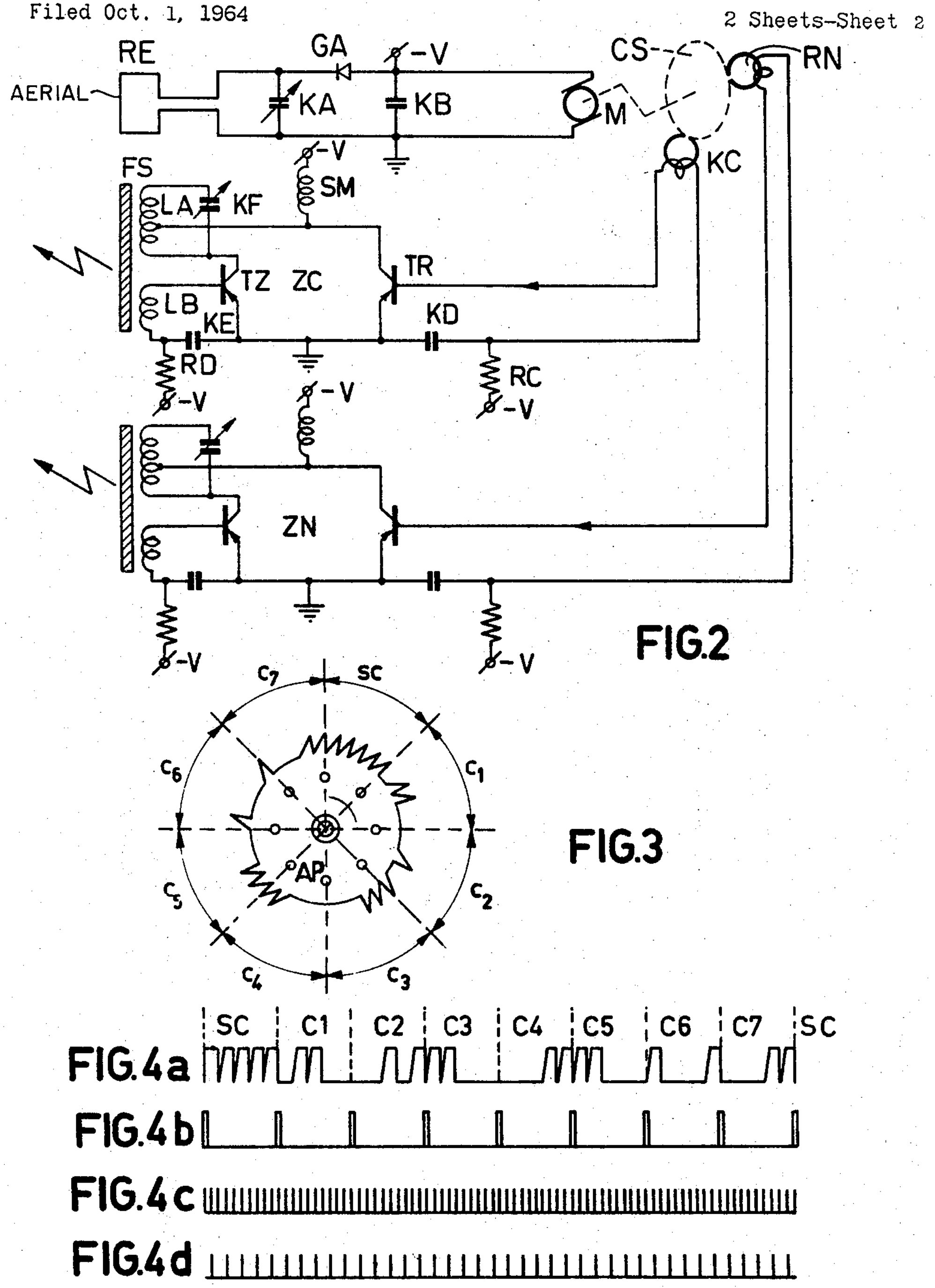

In the drawing FIG. 1 diagrammatically shows part of a testing device which is arranged fixedly along the railway track and FIG. 2 shows an identification apparatus which is mounted on the railway carriages.

FIG. 3 shows an example of a code disk and FIG. 4 relates to a pulse-time diagram.

The testing device shown in FIG. 1 comprises an auxiliary transmitter ZE which is capable of transmitting, through an aerial AE, energy with a frequency of, for example, 20 kc./s. to a receiving aerial RE (FIG. 2) on a passing railway carriage tuned to this frequency by means of the capacitor KA. The aerial AE is, for example, a frame aerial of a longitudinal shape, for example, 1 x 3 m., while the aerial RE is, for example, a frame aerial of 15 x 15 cm., so that also in the case of a train passing at high speed the aerial RE is in the radiation field of the aerial AE for a sufficiently long time. Of course the generator ZE need only be switched on when a train or a railway carriage passes.

The energy received by the aerial RE of the device shown in FIG. 2 is rectified by rectifier Ga so that a direct voltage −V is produced across the smoothing capacitor KB as a result of which on the other hand the motor M is driven and on the other hand the transmitters ZC and ZN are supplied. The total energy received is, for example, of the order of magnitude of 250 mw., which is consumed substantially entirely by the motor during the starting of the motor. The nominal speed of the motor is, for example, 25 r.p.s. and half of this speed is reached, for example in 40 m. sec. When the motor has reached its speed, the consumption is, for example, only 10. mw.

The motor M drives a code disk CS which is provided with teeth and holes AP characteristic of the object as shown in FIG. 3. The teeth and holes move along reading heads KN and KC, which consist of a winding on a permanently premagnetized magnetic circuit with air gap. The teeth and holes vary the magnetic resistance of the circuit, so that the reading heads supply pulses as shown in FIGS. *4a* and *4b*.

The voltage produced by the reading heads is proportional to the variation of the magnetic flux per unit of time, so proportional to the speed with which the magnetic resistance varies. In order to give the output pulses of the reading heads a proper rectangular shape, the teeth have the shape of a sawtooth with an inclined edge and a straight edge. The code disk CS shown in FIG. 3 is constructed for a code of eight code groups of each five elements, that is to say a start code group SC of five work elements (teeth) and seven identification digits C1, C2 . . . C7 formed by a two-out-of-five code, that is to say each code group has two work elements (teeth) and three rests elements. For example, the first digit C1 consists of a rest element, two work elements and two rest elements, the second digit C2 consists of two rest elements, one work element, one rest element and one work element etc. The holes AP are located at the beginning of each code group, so that the synchronizing pulses supplied by the scanning head KC mark the beginning of the successive code groups.

FIG. 4*a* shows the series of pulses which are supplied by the reading head KN when the code disk rotates and FIG. 4*b* shows the synchronizing pulses of the head KC.

The code may be varied in a simple manner by changing the code disk. The manufacture of a new code disk can be performed rapidly by means of a suitable punching apparatus. In practice the number of digits required to identify a railway carriage will generally be larger than seven and, for example, be from 12 to 15. These digits characterize, for example, the country of origin, the normal stand, the number of the railway carriage and so on. In general, such a code is fixedly awarded to a given railway carriage and consequently need not be varied. However, in practice the need may remain for a part of the code to be made variable, for example, a part which characterises the place of destination or the priority which depends upon the load, for example, quick-frozen articles. In such cases it is recommendable to mount the code disk rigidly and to move the reading heads along it under the control of the motor. The variable part of the code may then be adjusted by means of slides and the like.

The pulse series produced by the reading heads KC and KN are supplied to two transmitters ZC and ZN respectively which are constructed in a corresponding manner. The pulses of the head KC are amplified by the transistor TR, of which the emitter is connected to the positive terminal of the capacitor KB (ground), and the collector is connected through a choke coil SM to the supply point −V. The base is connected through the winding of the reading head KC and a resistor RC decoupled by the capacitor KD to the supply point −V. The transistor TZ is included in a generator circuit with a tuned circuit consisting of an inductor LA and a capacitor KN which determines the carrier frequency of the generator and is connected to the collector of the transistor TZ and further of a feedback winding LB connected to the base of the transistor TZ. The emitter of the transistor TZ is connected to ground and the base is connected to the winding LB and the resistor RD decoupled by the capacitor KE to the supply point −V. A tapping on the winding LA is connected to the collector of the transistor TR, so that the intensity of the oscillation produced by the generator is varied in accordance with the synchronizing pulses supplied by the reading head KC. The windings LA and LB are provided on the same ferrite rod FS, which at the same time serves as a transmitting aerial and transmits the amplitude-modulated signals through the receiving aerial PC to the receiver SC of the testing device shown in FIG. 1. The carrier frequency of the transmitter ZC is, for example, 55 kc./s. and the carrier frequency of the transmitter ZN which is constructed in a corresponding manner is 105 ks./c. The transmitter ZN transmits the identification signals from the reading head KN through the receiving aerial PN to the receiver SN of the testing device shown in FIG. 1. In the embodiment shown the transmitters are modulated in amplitude. Naturally, however, they may also be modulated in frequency.

The identification signal pulses supplied by the receiver SN are supplied, after limiting, to the input of a shift register SR which, under the control of the synchronizing pulses suppied by the receiver SC, is set in the zero condition with every synchronizing pulse through the conductor BA and the delay device VR. The shift register SR receives on the other hand shift pulses through the conductor BB at the instants which correspond to the centres of the elements of the identification code. Under the control of these shift pulses the binary information on the shift register is shifted in known manner over one place, while at the same time the binary information corresponding to the output voltage of the signal receiver SN is entered in the shift register SN at that instant.

The scanning of the elements of the identification code consequently takes place at instants which correspond to the centres of these elements, so that, if the pulses are distorted to a certain extent, the elements are nevertheless rated at the correct value. As is clear, the signal speed is linked up with the speed of rotation of the motor M, that is to say when starting the motor the speed is still low and, for example, the duration of a code element or a code group may be two or several times larger than when the motor has reached its speed. Since, however, it must also be possible that an identification takes place of railway carriages moving, for example, at a speed of 160 km./hour, it is desirable not to wait until the motor has reached the nominal speed but reading of the information must take place as soon as possible. In order to be able to indicate the centres of the various code elements at this variable signal speed all the same, the testing device is constructed so that these instants are derived from the duration of the preceding period between two synchronizing pulses. This is possible because the signal speed between two successive code groups varies only comparatively little, for example, less than 10%.

The testing device for this purpose comprises a pulse generator GR, the pulse frequency $f_0$ of which is high with respect to the pulse frequency of the code signals. The pulses of the generator GR are on the one hand supplied to the counting circuit TC and on the other hand to the frequency divider FD which decreases the frequency by a factor 10 to $\frac{1}{10} f_0$ and applies these pulses to the inputs of two gates PA and PB which are controlled in opposite phases by the bistable trigger FA. The trigger FA receives synchronizing pulses from the receiver SC through the conductor BC and changes its position with every pulse so that alternately in the one period between two synchronizing pulses the gate PA transmits the output pulses of the frequency divider FD to the counting circuit TA, the gate PB being cut off, and in the other period the gate PB transmits the pulses to the counting cricuit TB, the gate PA being cut off. At the instant that gate PA becomes conductive, the trigger circuit FA also supplies a pulse through the conductor BD as a result of which the counting circuit TA is set in the zero condition, while conversely when the gate PB becomes conductive the counting circuit TB is set in the zero condition by a pulse from the trigger circuit FA through the conductor BE. The counting circuits consequently each count alternately during the period between two synchronizing pulses and then remain in the assumed final position during the next period, which final position consequently is a measure of the duration of the preceding period. The coincidence circuits CA and CB respectively are controlled by the trigger circuit FA in a manner such that during the period the counting circuit TA receives no pulses, the coincidence circuit CA is operative and compares the assumed final position of the counting circuit TA with the continuously varying position of the counting circuit TC, while in the period that the counting circuit TB is stationary, the coincidence circuit CB compares the final position of the counting circuit TB with that of the counting circuit TC.

The counting circuit TC is reset in the rest condition by each synchronizing pulse through the conductor BF and the mixing gate MP and consequently stops counting from zero on. It is assumed that at such instant the counting circuit TA has assumed a condition which is characteristic of the duration of the preceding period, which condition is compared by the coincidence circuit CA with that of the counting circuit TC. Since the frequency of the pulses which are applied to the counting circuit TG by the generator G3 is ten times as large as the frequency of the pulses which are supplied to the counting circuit TA during the preceding period, however the counting circuit TC will reach a position which corresponds to the final position of the counting circuit TA in a time which equals $\frac{1}{10}$ of the duration of the preceding period between the synchronizing pulses. When equal conditions of the counting circuits are reached, the coincidence circuit CA supplies a pulse through the conductor BG to the bistable trigger circuit FB while on the other hand the counting circuit TC is again set in the rest condition by this pulse through the mixing gate MP and again starts counting until the final position of the counted TA is again reached, and so on. The coincidence circuit CA consequently supplies during this period pulses at instants which correspond to 1/10-period, 2/10-period, 3/10-period, and so on after the beginning of the period, that is to say at instants which correspond both to the centres of the code elements and also to the end of each code element, while in a corresponding manner during the following period pulses are supplied by the coincidence circuit CB. At the conductor BG pulses occur as shown in FIG. 4*c*. The incoming signals, however, have to be scanned and the shift pulses must be supplied to the shift register only at the instants which correspond to the centres of the elements, that is to say after 1/10-period, 3/10-period, 5/10-period, and so on. For this purpose the trigger circuit FB is set in a given rest condition with every synchronizing pulse through the conductor BF and then the trigger circuit FB varies its condition with every pulse from the coincidence circuits CA and CB. So each time the trigger circuit passes into the operating condition after 1/10-period, 3/10-period, 5/10-period, and so on after a synchronizing pulse and supplies a shift pulse through the conductor BB to the shift register SR as shown in FIG. 4*d*.

The shift register SR has five outputs which are connected on the one side to the vertical conductors of a coincidence matrix memory MG and on the other side to a coincidence circuit CC. The matrix memory MG is constructed in known manner and consists of a number of memory cores M11, M12, M21 and so on of magnetic material having a rectangular hysteresis loop which are each coupled to one vertical and one horizontal control conductor. The number of horizontal conductors is equal to the number of digit groups of the code. In the example four horizontal conductors are shown but in practice this number will be 12 to 15. The horizontal conductors HG1 and HG2 and so on are connected to different outputs of a counting circuit TD which is capable of receiving through the gate PD synchronizing pulses from the receiver SG and is thereby set in the following counting condition. In the rest condition of the circuit arrangement all memory cores are in a given remanence condition. A core can be set in the opposite remanence condition only when a current simultaneously flows through the horizontal and vertical conductor coupled to said core. In the rest condition of the device, however, the gate PE is cut off so that independent of the condition of the shift register SR no current can flow in the vertical conductors. A pulse through a horizontal conductor occurs only at instants at which the counting circuit TD reaches the corresponding counting condition. In the rest condition the gate PD is cut off and the counting circuit TD receives no counting pulses, so that no currents will flow through the horizontal conductors of the matrix memory MG.

As already noted, the shift register SR is reset in the rest condition by every synchronizing pulse. Under the control of the shift pulses the successive elements of the incoming code group is entered in the shift register so that at the end of the period a whole code group is recorded. These elements are tested by the coincidence circuit CC. When the start code group consisting of five work elements is received, the coincidence circuit CC reacts and supplies a pulse through the conductor BH to the bistable trigger circuit FC, as a result of which the latter is set in the operating condition. Under the control of the trigger circuit FC the gates PE and PD are released. At the same time the counting circuit TD is set in the rest condition by a pulse of the coincidence circuit CC through the conductor BK. By the following synchronizing pulse the shift register SR is set in the zero condition and also the counting circuit TD takes a step but in this case no pulse is applied to one of the horizontal conductors of the matrix memory MG.

During the following period the first digit code group is entered in the shift register SR and at the next following synchronizing pulse the counting circuit TD takes a step, a pulse being supplied to the first horizontal conductor HG1 of the matrix memory so that the first digit of the shift register is recorded at the corresponding line with the cores M11, M12 etc. of the matrix memory. The shift register SR is set to zero also by the synchronizing pulse. In order to be sure that the information is taken over by the matrix memory before it is erased in the shift register the erasing pulse across the line BA is delayed somewhat by the delaying device VR.

In a corresponding manner the other code digits are recorded in the matrix memory MG. Finally, again the start code combination consisting of five elements appears in the shift register, after which the coincidence circuit CC again supplies an output pulse and the trigger FC is reset in the rest condition, as a result of which the gates PE and PD are cut off, while also the trigger circuit FC supplies a pulse through the conductor BX to prove that the whole identification code is received.

By known means not shown the information is then read from the matrix memory MG, as a result of which the cores of this memory are reset in the rest remanence state.

What is claimed is:

1. A system for receiving a pulse code signal of the type in which said signal comprises code groups each having a predetermined number of code elements, said system comprising means for producing a first signal having a characteristic corresponding to the duration of a given code group, means for dividing said first signal into a plurality of sequential second signals having a characteristic corresponding to predetermined proportions of said first signal, the number of said plurality of second signals being proportional to the number of code elements in each said group, and means responsive to said second signals for scanning a second group of said pulse code signals subsequent said given code group at instants determined by said second signals, whereby the elements of said second group are scanned at a rate determined by the duration of said given group.

2. A system for receiving a pulse code signal in the form of a succession of pulse code groups each having a predetermined number of code elements, and a synchronizing signal for marking the beginning of each said group, said receiver comprising means for producing a first signal having a characteristic corresponding to the duration of time between the synchronizing signals corresponding to adjacent code groups, means responsive to said first signal for producing a successsion of second signals having durations corresponding to a predetermined number of equal proportions of said first signal, means for delaying said second signals whereby the second signals corresponding to a given code group are delayed to occur simultaneously with a second code group subsequent said given group, and means for scanning said pulse code signals at instants determined by said second signals.

3. A system for receiving a pulse code signal in the form of a succession of pulse code groups each having a predetermined number of code elements, and a synchronizing signal for marking the beginning of each said group, said receiver comprising a source of first and second pulse signals of constant repetition frequency, the repetition of said first pulse signals being lower than the repetition frequency of said second pulse signals, first and second counters, means responsive to said synchronizing signals for applying said first pulse signals to said first counter for the duration of a given code group, means for applying said second pulse signals to said second counter, means responsive to said synchronizing signals for comparing the counts of said first and second counters during a code group subsequent said given code group, whereby said comparing means produces an output pulse whenever a predetermined relationship occurs between the counts of said first and second counters, means for resetting said second counter with said output pulse, and means for scanning said pulse code groups with the output pulses of said first counter.

4. A system for receiving a pulse code signal in the form of a succession of pulse code groups each having a predetermined number of code elements, and a synchronizing signal for marking the beginning of each said group, said receiver comprising a source of first and second pulse signals of constant repetition frequency, the repetition frequency of said first pulse signals being lower than the repetition frequency of said second pulse signals, first, second and third counters, gate means responsive to said synchronizing signal for applying said first pulse signals to said first and third counters during alternate code groups, means for applying said second pulse signals to said second counter, first comparing means responsive to said synchronizing signal for comparing the counters of said first and second counters when said first pulse signals being applied to said third counter, second comparing means for comparing the counts of said second and third counters when said first pulse signals are being applied to said first counter, whereby said first and second comparing means produce output pulses upon detection of predetermined relationships between the counts of said first and second, and second and third counters respectively, means for resetting said second counter with the output pulses of said first and second comparing means, and means for scanning said pulse code groups with the output pulses of said first and second comparing means.

5. The system of claim 4 wherein said source of first and second pulse signals comprises a clock pulse generator for producing said second pulse signals, and frequency dividing means connected to said clock pulse generator for producing said first pulse signals.

6. The system of claim 4 wherein said gate means comprises first and second gates connected to apply said first pulse signals to said first and second counters respectively, and bistable trigger means responsive to said synchronizing signals connected to said first and second gates for alternately opening said first and second gates, and means connecting said trigger means to said first and third counters for resetting said first and second counters.

7. The system of claim 4 wherein said means for scanning comprises bistable means for dividing the output pulses of said first and second comparing means, and the ratio of the pulse frequency of said first and second pulses is twice the numbe of elements in each code group, whereby said elements are scanned at their centers.

8. The system of claim 4 wherein said scanning means comprises a shift register, means applying said pulse code groups to said shift register, means applying the outputs of said first and second comparing means to said shift register as shifting pulses, means responsive to said synchronizing pulses for resetting said shift register, and memory means connected to read out the elements of said shift register in parallel.

9. The system of claim 8 wherein said memory means comprises a memory matrix having a plurality of column conductors connected to the elements of said shift register, and a plurality of row conductors, comprising fourth counter means connected to said row conductors, and means for applying said synchronizing pulses to said fourth counter means whereby successive code groups are stored in separate rows of said matrix.

References Cited

UNITED STATES PATENTS

| | | | |
|---|---|---|---|
| 3,033,928 | 5/1962 | Biggam et al. | 178—69.5 |
| 3,067,285 | 12/1962 | Turner | 178—69.5 |

ROBERT L. GRIFFIN, *Primary Examiner.*

JOHN W. CALDWELL, *Examiner.*

R. L. RICHARDSON, *Assistant Examiner.*